United States Patent
Balraj et al.

(10) Patent No.: US 10,097,368 B2
(45) Date of Patent: Oct. 9, 2018

(54) WIFI ACCESS BASED ACTIONS/SCENES EXECUTION IN HOME AUTOMATION SECURITY PANELS

(71) Applicant: Honeywell International Inc., Morristown, NJ (US)

(72) Inventors: KamalaKannan Balraj, TamilNadu (IN); Philip J. Ferro, Setauket, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 78 days.

(21) Appl. No.: 14/682,593

(22) Filed: Apr. 9, 2015

(65) Prior Publication Data
US 2016/0301541 A1     Oct. 13, 2016

(51) Int. Cl.
| | | |
|---|---|---|
| *H04L 12/28* | (2006.01) | |
| *G06F 21/60* | (2013.01) | |
| *H04W 12/00* | (2009.01) | |
| *G08B 25/14* | (2006.01) | |
| *G08B 13/196* | (2006.01) | |
| *G08B 25/00* | (2006.01) | |

(52) U.S. Cl.
CPC ......... *H04L 12/2814* (2013.01); *G08B 25/14* (2013.01); *H04L 12/282* (2013.01); *H04L 12/2809* (2013.01); *G08B 13/1968* (2013.01); *G08B 25/008* (2013.01); *H04L 2012/2841* (2013.01)

(58) Field of Classification Search
CPC ............... H04L 12/28; G08C 2201/93; H04W 12/00–12/08; G06F 21/60
See application file for complete search history.

(56) References Cited

U.S. PATENT DOCUMENTS

| | | | |
|---|---|---|---|
| 8,350,694 B1 | 1/2013 | Trundle et al. | |
| 9,368,009 B2* | 6/2016 | Lee | H04L 12/2829 |
| 2002/0027502 A1* | 3/2002 | Mayor | G08B 25/14 |
| | | | 340/431 |
| 2008/0117922 A1* | 5/2008 | Cockrell | H04L 12/66 |
| | | | 370/401 |
| 2009/0243834 A1 | 10/2009 | Sennett et al. | |
| 2010/0277300 A1 | 11/2010 | Cohn et al. | |
| 2013/0142181 A1* | 6/2013 | Makim | H04L 12/2818 |
| | | | 370/338 |
| 2013/0150028 A1* | 6/2013 | Akins | H04W 4/02 |
| | | | 455/427 |
| 2013/0333016 A1 | 12/2013 | Coughlin et al. | |

(Continued)

OTHER PUBLICATIONS

Extended European search report from corresponding EP patent application 16163584.2, dated Jul. 7, 2016.

(Continued)

*Primary Examiner* — Xavier Szewai Wong
(74) *Attorney, Agent, or Firm* — Husch Blackwell LLP

(57) ABSTRACT

An apparatus including a security system that protects a secure geographic area of a home, a WiFi access point within the home coupled to the security system, a portable wireless device that detects the WiFi access point and matches an identifier of the WiFi access point with a reference identifier and the portable wireless device automatically downloading one or more instructions to the security system through the WiFi access point.

16 Claims, 1 Drawing Sheet

(56) References Cited

U.S. PATENT DOCUMENTS

| | | | |
|---|---|---|---|
| 2014/0266669 A1* | 9/2014 | Fadell | G05B 19/042 |
| | | | 340/501 |
| 2014/0282048 A1 | 9/2014 | Shapiro et al. | |
| 2014/0282841 A1* | 9/2014 | Kurosawa | G06F 21/62 |
| | | | 726/1 |
| 2015/0264573 A1* | 9/2015 | Giordano | H04L 63/08 |
| | | | 726/7 |
| 2015/0348554 A1* | 12/2015 | Orr | G10L 17/22 |
| | | | 704/275 |

OTHER PUBLICATIONS

European examination report from corresponding EP patent application16163584.2, dated Dec. 7, 2016.

\* cited by examiner

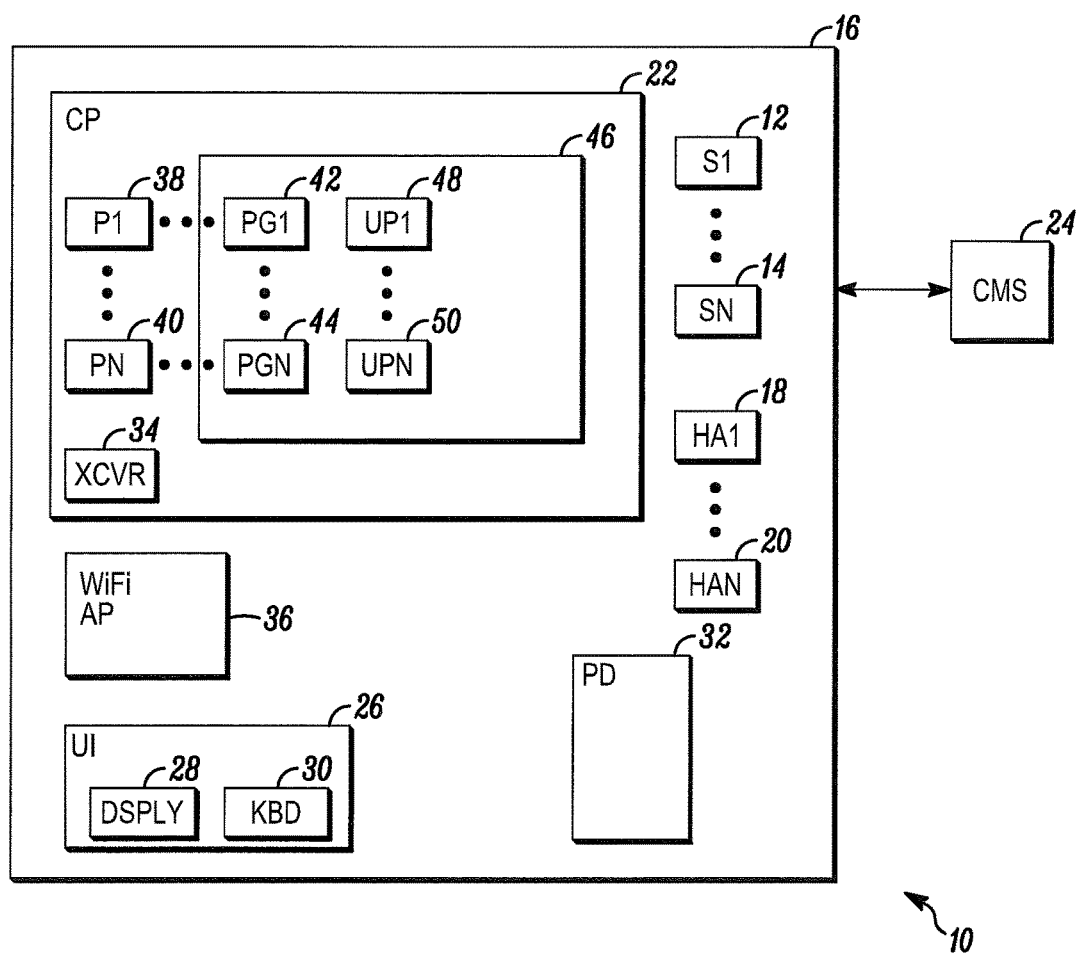

WIFI ACCESS BASED ACTIONS/SCENES EXECUTION IN HOME AUTOMATION SECURITY PANELS

FIELD

This application relates to security systems and to home automation systems used within homes.

BACKGROUND

Systems are known to protect people and assets within secured areas. Such systems are typically based upon the use of one more sensors that detect threats within the secured area.

Threats to people and assets may originate from any of number of different sources. For example, an intruder may rob or injure occupants who are present within the area. Alternatively, a fire may kill or injure occupants who become trapped by a fire in a home. Similarly, carbon monoxide from a fire may kill people in their sleep.

In order to detect threats, one or more sensors may be placed throughout a home. For example, intrusion sensors may be placed on the doors and/or windows of a home. Similarly, smoke detectors may be placed in a kitchen or other living areas. Alternatively, or in addition, carbon monoxide detectors may be placed near sleeping areas.

In most cases, threat detectors are connected to a local control panel. In the event of a threat detected via one of the sensors, the control panel may sound a local audible alarm. The control panel may also send a signal to a central monitoring station.

Home automation system, used within homes, are also known. Such systems may have their own control panels or may be incorporated into a home security system or visa versa. While such systems work well, there is ample opportunity to improve the overall operation of both systems by coordinating the activities of such systems.

BRIEF DESCRIPTION OF THE DRAWINGS

FIG. 1 illustrates a block diagram of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. The security system may incorporate a environmental and/or home automation system.

Included within the system are one or more sensors 12, 14 that detect threats within a secure geographic area 16. The threats may be physical or environmental. For example, at least some of the sensors may be limit switches placed on the doors and/or windows located around the periphery of a home or other residence of a user. Alternatively, some of the sensors may be passive infrared (PIR) detectors located in an interior of the space that detect intruders who have been able to circumvent the sensors on the doors or windows. Sensors may also be provided in the form of closed circuit television (CCTV) cameras with the ability to detect motion within a field of view of the camera. Other sensors may include card readers placed along the periphery of the secured area and intended to detect identification cards of authorized human users of the secured area.

The sensors may also include one or more environmental sensors. Environmental sensors may include fire and/or gas detectors placed within the secured area.

Also included within the secured area may be one or more home automation devices 18, 20. The home automation devices may include environmental control devices that control the heating or air conditioning of the home. The home automation devices may also include lighting control devices or devices that control a home entertainment center.

The sensors may be monitored by a control panel 22 either located within the secured area (as shown in FIG. 1) or located remotely. Upon detection of the activation of a threat sensor, the control panel may compose and send an alarm message to a central monitoring station 24. The central monitoring station may respond by summoning the appropriate help (e.g., police department, fire department, paramedics, etc.).

The security system may be controlled via a user interface 26 and/or a mobile or otherwise portable wireless device (e.g. a smartphone) 32. The user interface (and portable device) include a display and a keyboard. Alternatively, the display and keyboard may be integrated into a touchscreen.

The sensors and home automation devices may be wired or wireless. Where wireless, the control panel and each of the sensors and/or home automation devices include a radio frequency transceiver 34.

The secured area may also include a WiFi access point 36 coupled to the control panel. The portable device may obtain Internet access through the WiFi access point.

Included within the control panel, the sensors, the home automation devices, the portable device and the WiFi access point may be one or more processor apparatus (processors) 38, 40, each operating under control of one or more computer programs 42, 44 loaded from a non-transitory computer readable medium (memory) 46. As used herein, reference to a step performed by a computer program is also reference to the processor that executed that step.

Under the illustrated embodiment, the user interface may be the primary source of instructions for control of the security system. For example, a human user may enter a personal identifier number (PIN) and function key through the user interface to arm or disarm the security system.

Similarly, the user may enter a function and a target identifier to control features of the home automation system. For example, a user may activate a lighting pushbutton on the user interface and an identifier of a specific light to activate or deactivate a particular light fixture. Similarly, the user may activate an environmental button to raise or lower the temperature in the area via a thermostat using previously established set points or a home entertainment center button to activate or deactivate a home entertainment center.

Using the user interface, the use may create one or more user preference files 48, 50 controlling specific features of the security and home automation system. For example, one user preference file may identify a particular set of lights within the area that are to activated within all or a portion of the area under the preference. Another preference may include a temperature of the area or the type of music played through the home entertainment center.

Other preferences may be created for use of the security system. For example, upon disarming of the security system, one preference may be for the display of a list of previous arm/disarm commands and a user identifier associated with each or of identifiers and times of previous security breaches. Alternatively, another preference following entry of a disarm command may be the display of live video on the user interface from a particular camera or of previously recorded video of detected motion outside a front door.

Under one illustrated embodiment, customized scenes/smart actions or other user preferences may be activated automatically upon entry of the user into the secured area. For example, operating in the background on the portable device may be a user preferences processor that detects entry of the user into the secured area. The preferences processor may detect entry into the secured area by detecting the unique system identifier of the WiFi access point. This may be accomplished via a getActiveNetworkInfo function utility available on the portable device.

Using the getActiveNetworkInfo function, the preferences processor may detect the identifier of any nearby WiFi access points. Upon entering the secured area, the preferences processor detects the unique identifier of the WiFi access point of the secured area and matches the detected identifier with a reference identifier in a memory of the portable device.

Upon detecting a match, the preferences processor or a related processor sends one or more instructions to the security system automatically setting or otherwise implementing the preferences of the user as the user enters the secured area. Within the security system, a corresponding processor may receive and execute the instructions from the portable device.

The instructions may be in the form of executable code or in the form of an identifier of a preference file. Where in the form of an identifier, the identifier may include an IP address of the function as well as a specific user preference available under the function.

The instructions may change aspects of the security and/or home automation system or push messages back to the portable device. For example, one particular command may cause a list of recent security breaches to be instantly shown on the display of the portable device.

Security for sending instructions to the security system may be provided via previous sign-in for Internet service. For example, access to the Internet through the access point may only be available by signing into the access point using a password printed on the back of the WiFi device or otherwise. Other levels of security (and passwords) may be required based upon the preferences to be automatically executed upon entry into the secured area.

The above system offers a number of advantages over conventional systems. For example, currently available home security panels can execute scenes/smart actions by voice commands, preconfigured schedules or can trigger preferences on the occurrence of events associated with other preconfigured schedules. However, there is no intelligent way to instantly execute scenes in a panel based upon user entry/presences. The system of FIG. 1, as described above, operates to execute customized functions based upon home WiFi access by a user.

The system of FIG. 1 triggers the customized scenes/smart actions while a user otherwise accesses his home WiFi network. In general, all home user mobiles would have been paired with the home WiFi router network. Hence, whenever an authorized mobile accesses the home WiFi network, the mobile app will send information to the panel and trigger the smart actions/preconfigured customized screens for the user.

As soon as a user enters the home WiFi access area, the panel executes the smart actions/customized scenes in their expected preconfigured zone. This feature can be extended further to identity the number of users in a home and panel messages can be pushed to their respective mobiles while they are entering into their home premises.

In general, the system may include a security system that protects a secure geographic area of a home, a WiFi access point within the home coupled to the security system, a portable wireless device that detects the WiFi access point and matches an identifier of the WiFi access point with a reference identifier and the portable wireless device automatically downloading one or more instructions to the security system through the WiFi access point.

Alternatively, the system may include a security and home automation system that controls a secure geographic area of a home, a WiFi access point within the home coupled to the security and home automation system, a portable wireless device that detects the WiFi access point and forms an Internet connection through the WiFi access point, a processor of the portable wireless device that matches an identifier of the WiFi access point with a reference identifier saved in memory and the portable wireless device automatically downloading at least one instruction to the security and home automation system through the WiFi access point.

Alternatively, the system may include a security and environmental automation system that controls a secure geographic area, a WiFi access point within the secure geographic area that is coupled to the security and environmental automation system, a portable wireless device that detects the WiFi access point and forms an Internet connection through the WiFi access point, a processor of the portable wireless device that matches an identifier of the WiFi access point with a reference identifier saved in memory and the portable wireless device automatically downloading at least one instruction to the security and home automation system through the WiFi access point.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
a security system that protects a secure geographic area of a home;
a WiFi access point within the home coupled to the security system; and
a portable wireless device that detects the WiFi access point as the portable wireless device enters the secure geographic area, receives a first identifier of the WiFi access point from the WiFi access point, activates a getActiveNetworkInfo function to detect the first identifier of the WiFi access point, and matches the first identifier of the WiFi access point with a reference identifier stored in a memory of the portable wireless device,
wherein the portable wireless device automatically transmits one or more instructions to the security system through the WiFi access point when the portable wireless device matches the first identifier with the reference identifier, wherein, responsive to receiving the one or more instructions, the security system transmits a list of previous arm/disarm commands for the security system to the portable wireless device, wherein the list of the previous arm/disarm commands includes a respective user identifier associated with each of the previous arm/disarm commands, and wherein the portable wireless device displays the list of the previous arm/disarm commands.

2. The apparatus as in claim 1 wherein the security system includes a home automation system.

3. The apparatus as in claim 1 wherein the portable wireless device includes a smartphone.

4. The apparatus as in claim 1 wherein a processor of the portable wireless device requests Internet access through the WiFi access point.

5. The apparatus as in claim 1 wherein the one or more instructions activate one or more lights within the secure geographic area.

6. The apparatus as in claim 1 wherein the one or more instructions activate an entertainment center within the secure geographic area.

7. The apparatus as in claim 1 wherein the one or more instructions change a temperature setting of a thermostat within a portion of the secure geographic area.

8. A system comprising:
a security and home automation system that controls a secure geographic area of a home;
a WiFi access point within the home coupled to the security and home automation system;
a portable wireless device that detects the WiFi access point, forms an Internet connection through the WiFi access point as the portable wireless device enters the secure geographic area, and receives a first identifier of the WiFi access point from the WiFi access point; and
a processor of the portable wireless device that activates a getActiveNetworkInfo function to detect the first identifier of the WiFi access point and matches the first identifier of the WiFi access point with a reference identifier saved in a memory of the portable wireless device,
wherein the portable wireless device automatically transmits at least one instruction to the security and home automation system through the WiFi access point when the portable wireless device matches the first identifier with the reference identifier,
wherein, responsive to receiving the at least one instruction, the security and home automation system transmits a list of previous arm/disarm commands for the security and home automation system to the portable wireless device,
wherein the list of the previous arm/disarm commands includes a respective user identifier associated with each of the previous arm/disarm commands, and
wherein the portable wireless device displays the list of the previous arm/disarm commands.

9. The system as in claim 8 wherein the at least one instruction includes a reference to a user preference file that controls a specific feature of the security and home automation system when the user preference file is executed by the security and home automation system.

10. The system as in claim 9 wherein the specific feature includes activating a set of lights within a portion of the secure geographic area.

11. The system as in claim 9 wherein the specific feature includes activating a home entertainment system.

12. The system as in claim 9 wherein the specific feature includes setting an environmental level of the secure geographic area.

13. The system as in claim 12 wherein the environmental level is a set point of a thermostat.

14. An apparatus comprising:
a security and environmental automation system that controls a secure geographic area;
a WiFi access point within the secure geographic area that is coupled to the security and environmental automation system;
a portable wireless device that detects the WiFi access point, forms an Internet connection through the WiFi access point as the portable wireless device enters the secure geographic area, and receives a first identifier of the WiFi access point from the WiFi access point; and
a processor of the portable wireless device that activates a getActiveNetworkInfo function to detect the first identifier of the WiFi access point and matches the first identifier of the WiFi access point with a reference identifier saved in a memory of the portable wireless device,
wherein the portable wireless device automatically transmits at least one instruction to the security and environmental automation system through the WiFi access point when the portable wireless device enters the secure geographic area,
wherein, responsive to receiving the at least one instruction, the security and environmental automation system transmits a list of previous arm/disarm commands for the security and environmental automation system to the portable wireless device,
wherein the list of the previous arm/disarm commands includes a respective user identifier associated with each of the previous arm/disarm commands, and
wherein the portable wireless device displays the list of the previous arm/disarm commands.

15. The apparatus as in claim 14 where the WiFi access point operates under an IEEE 802.11x format.

16. The apparatus as in claim 14 wherein the at least one instruction changes a setting of the security and environmental automation system.

* * * * *